United States Patent
Labeau

(10) Patent No.: US 12,018,176 B2
(45) Date of Patent: Jun. 25, 2024

(54) METAL SURFACE TREATMENT

(71) Applicant: SPECIALTY OPERATIONS FRANCE, Lyons (FR)

(72) Inventor: Marie-Pierre Labeau, Sevres (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 500 days.

(21) Appl. No.: 17/293,537

(22) PCT Filed: Nov. 27, 2019

(86) PCT No.: PCT/EP2019/082790
§ 371 (c)(1),
(2) Date: May 13, 2021

(87) PCT Pub. No.: WO2020/109411
PCT Pub. Date: Jun. 4, 2020

(65) Prior Publication Data
US 2022/0002562 A1    Jan. 6, 2022

(30) Foreign Application Priority Data
Nov. 27, 2018 (EP) .................... 18208616

(51) Int. Cl.
| | | |
|---|---|---|
| *C09D 5/08* | (2006.01) | |
| *C08F 220/06* | (2006.01) | |
| *C09D 5/00* | (2006.01) | |
| *C09D 133/02* | (2006.01) | |
| *C23C 22/36* | (2006.01) | |
| *C23C 22/78* | (2006.01) | |
| *C23C 22/83* | (2006.01) | |

(52) U.S. Cl.
CPC .............. *C09D 5/08* (2013.01); *C08F 220/06* (2013.01); *C09D 5/002* (2013.01); *C09D 133/02* (2013.01); *C23C 22/36* (2013.01); *C23C 22/78* (2013.01); *C23C 22/83* (2013.01); *C08F 2800/10* (2013.01)

(58) Field of Classification Search
None
See application file for complete search history.

(56) References Cited

U.S. PATENT DOCUMENTS

| | | | | |
|---|---|---|---|---|
| 4,191,596 | A |   | 3/1980 | Dollman et al. |
| 4,647,638 | A |   | 3/1987 | Yokoshima et al. |
| 4,882,215 | A | * | 11/1989 | Ushio .................. C10M 171/06 148/251 |
| 4,921,552 | A | * | 5/1990 | Sander .................... C23C 22/34 148/251 |
| 6,214,467 | B1 | * | 4/2001 | Edwards ............... C08F 265/06 428/407 |
| 2003/0134973 | A1 | * | 7/2003 | Chen ..................... C08F 246/00 524/804 |
| 2006/0011293 | A1 |   | 1/2006 | Xia et al. |
| 2007/0095435 | A1 | * | 5/2007 | Lammerschop ........ C23C 22/34 148/250 |
| 2016/0331668 | A1 | * | 11/2016 | Zaidel ..................... C08L 43/02 |
| 2017/0151158 | A1 | * | 6/2017 | Myers ...................... A61K 8/39 |
| 2018/0125771 | A1 | * | 5/2018 | Myers ...................... A61K 8/86 |

FOREIGN PATENT DOCUMENTS

| | | | | |
|---|---|---|---|---|
| CN | 106589213 | A |   | 4/2017 |
| CN | 107236440 |   | * | 10/2017 ............ C08F 212/08 |
| CN | 107236440 | A | * | 10/2017 ............ C08F 212/08 |
| CN | 107236440 | A |   | 10/2017 |
| JP | S50/14663 | B1 | * | 5/1975 ............. C08F 30/00 |
| JP | H05/0247382 | A | * | 9/1993 ................ C08F 2/24 |
| WO | 9713588 |   |   | 4/1997 |

OTHER PUBLICATIONS

Yamanuchi—JP S50-14663 B1—J-PLAT Info+MT+Espacenet CLM+Spec—1975 (Year: 1975).*
Itou—JP H05-247382 A—MT—polymer similar to claimed—1993 (Year: 1993).*
Zhou—CN 107236440 A—PCT D1—MT—salt-mist resistant acrylic acid dispersion—2017 (Year: 2017).*
Office Action issued in Brazilian Application No. BR112021008656-0, mailed on Aug. 7, 2023 (5 pages).

* cited by examiner

*Primary Examiner* — John Vincent Lawler
(74) *Attorney, Agent, or Firm* — Osha Bergman Watanabe & Burton LLP

(57) ABSTRACT

The instant invention concerns the use of at least one polymer P obtained by radical copolymerization of a mixture of (i) acrylic acid; (ii) methacrylic acid; and (iii) at least one 2-hydroxyethyl methacrylate phosphate for treating a metallic surface intended to be coated by a paint, a varnish or an adhesive. The invention also concerns methods of coatings making use of this polymer P, compositions comprising the polymer P and useful for these methods, and the obtained coated materials.

15 Claims, No Drawings

METAL SURFACE TREATMENT

This application is a U.S. national phase entry under 35 U.S.C. § 371 of International Application No. PCT/EP2019/082790, filed on Nov. 27, 2019, which claims priority to European Application No. 18208616, filed on Nov. 27, 2018. The entire contents of these applications are explicitly incorporated herein by this reference.

The instant invention relates to the field of the treatment of surfaces based on metal, and especially metal surfaces intended to be coated with film-forming organic compositions such as paints, varnishes or adhesive compositions. The invention is more especially directed to a treatment of said metal surfaces aiming at providing a protection especially against corrosion and/or an enhancement of the adherence of the film-forming organic.

In order to provide such effects on metal surfaces, especially on aluminum or steel, several methods have been proposed, including i.a. the deposit of inorganic coatings on the surface of the metal, especially the so-called "conversion coating".

The term "conversion coating" is well known in the art and refers to a layer formed on the surface of a metal, that is an advantageous replacement of native oxide on said surface (especially on aluminum), and which is obtained by the controlled chemical formation of a film on the metallic surface by reaction with chemical elements of the metallic surface, so that at least some of the cations dissolved from the metallic material are deposited in the conversion coating.

Typically, coating such as conversion coatings are obtained by reacting the metal surface with solutions containing metal cation and fluorides. In the past, chromium-containing coatings have been proposed (typically obtained by reaction of the surface with a solution including $H_2CrF_6$), and, more recently, less toxic coatings based e.g. on zirconium, titanium or other metals (for example obtained by reaction of the surface with a solution including $H_2TiF_6$, $H_2ZrF_6$, $H_2HfF_6$, $H_2AlF_6$, $H_2SiF_6$, $H_2GeF_6$, $H_2SNF_4$, or $HBF_4$). A conversion coating may include other compounds such as silane precursors for example.

For enhancing the corrosion resistance and paint adhesion on a coating such as conversion coatings it is known to add some additives, especially organic polymers. In this connection, it has been for example described the use of polyacrylic acids. A typical additive is ACUMER™ 1510 available from DOW (and previously form Rohm & Haas) that has been widely described for this kind of application. For more details in this connection, it may be especially be referred to WO97/13588, U.S. Pat. Nos. 4,191,596, or 4,921,552.

One aim of the present invention is to provide a new method for treating a metal surface, which imparts a good protection of the metal surface against corrosion and a good adherence of film-forming organic compositions such as paints, varnishes or adhesive compositions applied to the metal surface.

To this end, the instant invention proposes to make use of a specific polymer, preferably together with (namely before, during, or after) the formation of a conversion coating, which advantageously leads to treated metal surface that reveals very interesting: when coated by a film-forming compositions such as a paint, varnish or adhesive composition, a good adherence is obtained between the surface and the coated composition. Besides, a good protection of the surface is obtained, especially against corrosion.

More precisely, the instant invention make use of at least one Polymer P, which is a polymer obtained by radical copolymerization of a mixture of acrylic acid, methacrylic acid, and at least one 2-hydroxyethyl methacrylate phosphate of Formula (a) below:

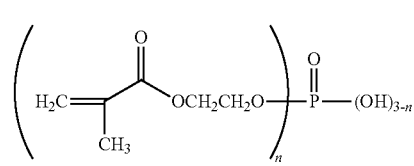

Formula (a)

wherein n is 0, 1 or 2.

Typically, the polymer P is obtained by radical copolymerization of a mixture of acrylic acid, methacrylic acid, and a mixture of several 2-hydroxyethyl methacrylate phosphates of formula (a), with different values of n.

Preferably, the polymer P is obtained by radical copolymerization of a mixture having the following molar ratio, based on the total quantity of acrylic acid, methacrylic acid and 2-hydroxyethyl methacrylate phosphates of fomula (a):
- acrylic acid (AA): from 80 to 90% (e.g., about 83-85%),
- methacrylic acid (MAA): 5 to 15% (e.g., about 11-13%)
- 2-hydroxyethyl methacrylate phosphates: 2 to 6% (e.g., about 4%)

Besides, the polymer P used according to the invention preferably has a molecular weight of at least 7,500 Da, e.g. 10 kDa to 1500 kDa, for example 10 kDa to 150 kDa, notably between 10 and 100 kDa. Typically, the polymer P used according to the invention has a molecular weight of from 10 to 40 kDa, e.g., 20 to 30 kDa.

A polymer P especially suitable for the invention is a random copolymer having a weight average molecular weight of about 20 to 30 kDa, that is the copolymerized product of a mixture of acrylic acid, methacrylic acid, and 2-hydroxyethy methacrylate phosphates of Formula (a), preferably in a molar ratio of about 85:11:4 or 83:13:4.

A commercial product suitable for the invention is e.g. the polymer MIRAPOL® 8801 available from SOLVAY.

In the scope of the invention, the inventors have now observed than the use of Polymer P leads to a protection and a promotion of adherence between the metal surface and a paint coated on the surface that are better than those observed with usual additives such as ACUMER™ 1510.

According to a specific aspect, one specific object of the instant invention is the use of at least one polymer P as defined above for treating a metallic surface intended to be coated by a paint, a varnish or an adhesive. The metal surface to be treated is preferably a surface comprising a metal selected from aluminum, steel, zinc, magnesium and their alloys. The invention is especially interesting for metal surface of aluminum or aluminum alloy.

According to an interesting embodiment, a conversion coating is applied on the metallic surface to be treated, by reaction of said surface with a conversion composition (in other words, a conversion composition a is applied on the metallic surface for forming a conversion coating thereon). In that case, typically:
- the conversion composition include all or part of the polymer P as an additive; and/or
- the conversion coating is applied on the metallic surface and then all or part of the polymer P is applied on the conversion coating.

According to another possible embodiment, compatible with the previous one, all or part of the polymer P is present in a paint, a varnish or a coating applied on the surface, preferably after application of a conversion coating on the metal surface.

According to another aspect, one other specific object of the invention is a process for coating a metallic surface with a paint, a varnish or an adhesive, preferably with a paint, including a step of treating said surface with at least one composition including at least one polymer P as defined above. In that scope, the composition comprising the polymer P may typically be:
- a conversion composition including a polymer P; and/or
- a solution or a dispersion of the polymer P, preferably applied on the surface after having applied a conversion coating on the surface to be treated; and/or
- the paint, varnish or adhesive, that may comprise all or part of the polymer P.

The conversion composition including a polymer P and the paint, varnish or adhesive compositions containing the same also constitute specific object of the instant invention Typically, the polymer P is present in the conversion composition and/or in a solution or dispersion applied on a conversion coating. In that case, the paint, varnish or adhesive is applied on a surface previously treated by the polymer. According to some specific embodiments, an additional layer may applied between the treated surface and the paint, varnish or adhesive is applied (this is for example the case for the treatment of metal foil on a first site, that have then to be coated, for example painted, on a second site: in that case, a lubricant may be applied on the treated foil, in order to allow to roll the foil and ease its transportation).

According to yet another aspect, a specific object of the instant invention are the materials comprising a metal surface comprising a metal surface which is in all or part (i) treated with a polymer P as defined above and (ii) covered by a paint, a varnish or an adhesive.

These materials include i.a. materials that have a metal surface in all or part covered by:
- at least one coating (typically a conversion coating and/or a paint, a varnish or an adhesive layer) comprising at least one polymer P;
and/or
- a layer (typically a conversion coating) comprising a reaction product of the polymer P as defined above with a metal of the treated surface or another compound present in said layer.

Specific features and possible embodiments will now be described in more details.

The Treated Metal Surface

Any metal surface may be treated with polymer P of the invention, but the invention is especially suitable for treating metal surfaces of:
- aluminum or an aluminum-based alloy; or
- steel, for example galvanized steel (hot dip galvanized HDG or electrogalvanized EG); or cold rolled steel (CRS); or
- magnesium or magnesium-based alloys; or
- Zinc or zinc-based alloys The invention is especially interesting for metal surface of aluminum and aluminum alloys, such as Aluminum Alloy AA 5005 tested in the appended examples, or other alloys such as those of Series 1xxx, 2xxx, 3xxx, 4xxx, 5xxxx, 6xxx, such as AA1050, 2024, 3003, 5182, 5754, 6111, 6016, 6060, 6063, 6182.

The Conversion Coating

When a conversion coating is applied on the metal surface to be treated according to the invention, it may be obtained by contacting the surface with any conversion composition known from the prior art.

Contacting the metal surface with the conversion composition may be made by any means known per se, such as dip coating in a conversion bath or spray coating, as illustrative examples.

The conversion composition used according to the invention may typically contain fluorides anions and cationic metals, e.g. compounds such as $H_2CrF_6$, or more preferably chromium free compounds such as $H_2TiF_6$, $H_2ZrF_6$, $H_2HfF_6$, $H_2AlF_6$, $H_2SiF_6$, $H_2GeF_6$, $H_2SNF_4$, or $HBF_4$.

The conversion composition may also include other compounds, such as silane precursors for example, and/or cerium salts, and/or terbium molybdate.

In addition, according to a specific embodiment, the conversion composition may contain all or part of the polymer P used according to the invention for treating the surface. In that case, the application of the conversion layer lads per se to a surface treatment according to the invention.

Otherwise, the treatment is typically obtained after the formation of the conversion layer, by contacting the metal surface carrying the conversion layer with the polymers P (they may typically be applied on the conversion layer in the form of a solution or a suspension of polymers P, or within a paint, a varnish or an adhesive composition applied on the conversion layer).

According to a specific embodiment, it may be contemplated to make use of the polymer P both in the conversion composition and within a paint, a paint, a varnish or an adhesive composition applied on the conversion layer.

The following examples illustrate the invention.

EXAMPLE

MIRAPOL® 8801 has been tested in this example, which has been compared to ACUMER 1510.

Tests have been performed on aluminum alloy panels (AA5005, from Q-Panel), with usual lab equipment (beakers, oven, . . . ), a powder coating installation (GEMA 2C from Industrie Systemes) and a corrosion chamber (Q-FOG CRH 600L, from QFOG).

In each test, the following protocol has been applied:

Cleaning and Etching
It was made by dipping each pannel to be tested in a combined cleaning-etching bath, which was a 1L bath is typically made by diluting a commercially available formulation, DBT ALU 200, available from Chemtec Aertec (5 g of DBT ALU 200 into 995 g of water). The pannel was dipped in the cleaning-etching bath for 3 min under light stirring (200 rpm) at 50° C. The pannel was then rinsed with 1 L of de-ionized water.

Treatment
It was performed by dipping the panel obtained after the cleaning/etching of the previous step in a treatment bath, which was a1L bath made by diluting in water:
zirconium hexafluoride $H_2ZrF_6$ at a concentration of 200 ppm active (0.02 wt %); and
the additive to be tested (MIRAPOL® 8801 according to the invention; or ACUMER™ 1510 in the comparative examples), at concentrations from 50 ppm active (0.005 wt %) up to 1,000 ppm (0.1 wt %) given in the tables below:

The panel was immersed for 2 min in the treatment bath at 25° C. It was not rinsed.

The excess of bath solution was flushed away from the surface with compressed air.

The panel was then dried for 30 min in an oven at 60° C.

Painting:

Each panel was then painted with a polyester white powder paint from RIPOL (BIANCO RAL 9010).

Tests

Each Panel was then tested according to protocols similar to those described in the following standards listed below:

Acetic acid salt spray: T=35(+/−2)° C., [NaCl]=50(+/−5) g/L, pH=3.1-3.3 (ISO 9227)
Scribing protocol: as described in ISO 17872
Degree of rusting quoted as described in ISO 4628-3
Degree of blistering quoted as described in ISO 4628-2

Rusting Results (assessed according to ISO 4628-3)

| | Polymer | | | | | |
|---|---|---|---|---|---|---|
| | ACUMER™ 1510 Comparative | | | MIRAPOL® 8801 | | |
| exposure time | 308 h | 564 h | 758 h | 308 h | 564 h | 758 h |
| 0.005 wt % | R1 | R3 | R3 | R1 | R1 | R3 |
| 0.010 wt % | R1 | R2 | R3 | R1 | R1 | R3 |
| 0.020 wt % | R1 | R3 | R3 | R0 | R0 | R2 |
| 0.100 wt % | R1 | R2 | R2 | R0 | R1 | R2 |

Whatever the concentration, rusting appears faster with the comparative example.

Blistering Results (assessed according to ISO 4628-2)

| | Polymer | | | | | |
|---|---|---|---|---|---|---|
| | ACUMER™ 1510 Comparative | | | MIRAPOL® 8801 | | |
| exposure time | 308 h | 564 h | 758 h | 308 h | 564 h | 758 h |
| 0.005 wt % | 1S1 | 1S1 | 1S1 2S1 2S1 | 1S1 | 1S1 | 2S2 1S2 1S1 |
| 0.010 wt % | 1S1 | 1S1 | 2S1 2S1 2S1 | 1S1 | 1S1 | 2S1 2S1 2S1 |
| 0.020 wt % | 1S1 | 2S1 | 3S1 3S1 3S1 | 0 | 0 | 0 |
| 0.100 wt % | 0 | 1 little blister | 2S1 2S1 2S1 | 1S1 | 1S1 | 3S1 2S1 3S1 |

Here again, the results are better with the polymer according to the invention.

The invention claimed is:

1. A method, comprising treating a metallic surface intended to be coated by a paint, a varnish or an adhesive with at least one polymer P obtained by radical copolymerization of a mixture of (i) acrylic acid; (ii) methacrylic acid; and (iii) at least one 2-hydroxyethyl methacrylate phosphate of Formula (a) below:

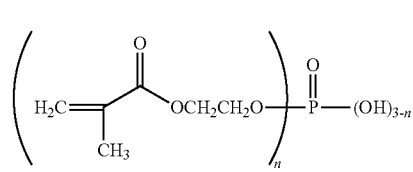

Formula (a)

wherein n is 1 or 2, wherein the polymer P is obtained by radical copolymerization of a mixture having the following molar ratio, based on the total quantity of acrylic acid, methacrylic acid and 2-hydroxyethyl methacrylate phosphates of formula (a):

acrylic acid: from 80 to 90%
methacrylic acid: 5 to 15%
2-hydroxyethyl methacrylate phosphates: 2 to 6%.

2. The method of claim 1, wherein the polymer P has a molecular weight of at least 7,500 Da.

3. The method of claim 2, wherein the polymer P has a molecular weight of 10 kDa to 1500 kDa.

4. The method according to claim 1, wherein the metal surface is a surface comprising a metal selected from aluminum, steel, zinc, magnesium and their alloys.

5. The method according to claim 4, wherein the metal surface is a surface of aluminum or aluminum alloy.

6. The method according to claim 1, wherein a conversion composition a is applied on the metallic surface for forming a conversion coating thereon, and wherein:

said conversion composition include all or part of the polymer P as an additive; and/or the conversion coating is applied on the metallic surface, and then all or part of the polymer P is applied on the conversion coating.

7. The method of claim 1, wherein all or part of the polymer P is present in a paint, a varnish or a coating applied on the surface.

8. The method according claim 7, wherein all or part of the polymer P is present in a paint, a varnish or a coating applied on the surface after application of a conversion coating on the metal surface.

9. A process for coating a metal surface with a paint, a varnish or an adhesive, comprising a step of treating said surface with at least one composition including at least one polymer P, wherein polymer P is obtained by radical copolymerization of a mixture of (i) acrylic acid; (ii) methacrylic acid; and (iii) at least one 2-hydroxyethyl methacrylate phosphate of Formula (a) below:

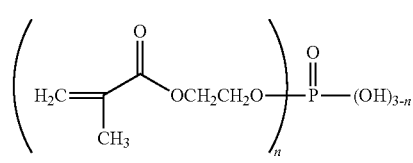

Formula (a)

wherein n is 1 or 2, wherein the polymer P is obtained by radical copolymerization of a mixture having the following molar ratio, based on the total quantity of acrylic acid, methacrylic acid and 2-hydroxyethyl methacrylate phosphates of formula (a):
acrylic acid: from 80 to 90%
methacrylic acid: 5 to 15%
2-hydroxyethyl methacrylate phosphates: 2 to 6%.

10. The process according to claim 9, wherein the process is for coating a metallic surface with a paint.

11. The process according to claim 9, wherein the composition comprising the polymer P is:
a conversion composition including a polymer P; and/or
a solution or a dispersion of the polymer P; and/or
the paint, varnish or adhesive, that comprise a polymer P.

12. The process according to claim 11, wherein the composition comprising the polymer P is a solution or a dispersion of the polymer P applied on the surface after having applied a conversion coating on the surface to be treated.

13. A conversion composition, paint, varnish or adhesive composition including at least one polymer P, wherein polymer P is obtained by radical copolymerization of a mixture of (i) acrylic acid; (ii) methacrylic acid; and (iii) at least one 2-hydroxyethyl methacrylate phosphate of Formula (a) below:

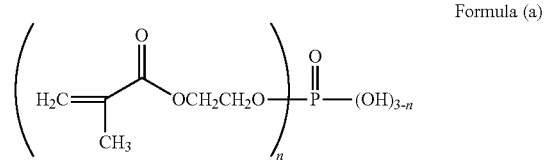

Formula (a)

wherein n is 1 or 2,
wherein the polymer P is obtained by radical copolymerization of a mixture having the following molar ratio, based on the total quantity of acrylic acid, methacrylic acid and 2-hydroxyethyl methacrylate phosphates of formula (a):
acrylic acid: from 80 to 90%
methacrylic acid: 5 to 15%
2-hydroxyethyl methacrylate phosphates: 2 to 6%.

14. A material comprising a metal surface which is in all or part (i) treated with at least one polymer P and (ii) covered by a paint, a varnish or an adhesive, wherein polymer P is obtained by radical copolymerization of a mixture of (i) acrylic acid; (ii) methacrylic acid; and (iii) at least one 2-hydroxyethyl methacrylate phosphate of Formula (a) below:

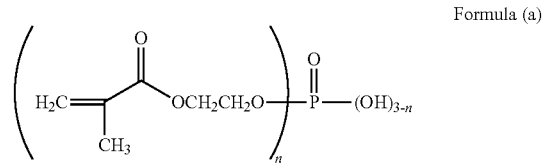

Formula (a)

wherein n is 1 or 2,
wherein the polymer P is obtained by radical copolymerization of a mixture having the following molar ratio, based on the total quantity of acrylic acid, methacrylic acid and 2-hydroxyethyl methacrylate phosphates of formula (a):
acrylic acid: from 80 to 90%
methacrylic acid: 5 to 15%
2-hydroxyethyl methacrylate phosphates: 2 to 6%.

15. The material according to claim 14, wherein said material is a material having a metal surface in all or part covered by:
at least one coating comprising at least one polymer P; and/or
a layer comprising a reaction product of at least one polymer P with a metal of the treated surface or another compound present in the layer.

* * * * *